United States Patent [19]
Lawrence

[11] Patent Number: 5,068,822
[45] Date of Patent: Nov. 26, 1991

[54] SINGLE-STAGE EXTENSIBLE SORTER FOR SORTING DATA AND EFFICIENTLY READING OUT SORTED DATA, INCORPORATING SINGLE-BIT DEVICES

[75] Inventor: Richard H. Lawrence, Hudson, Mass.

[73] Assignee: Digital Equipment Corporation, Maynard, Mass.

[21] Appl. No.: 168,974

[22] Filed: Mar. 16, 1988

[51] Int. Cl.[5] ............ G06F 7/02; G06F 7/04; G06F 7/22; G06F 7/24

[52] U.S. Cl. ................ 395/775; 364/923.6; 364/926.5; 364/925.5; 364/927.8; 364/931.02; 364/931.41; 364/942; 364/942.03; 364/947.6; 364/DIG. 2

[58] Field of Search ................ 364/200, 900

[56] References Cited

U.S. PATENT DOCUMENTS 4,030,077 6/1977 Florence et al. .......... 364/900
4,031,520 6/1977 Rohner .................... 364/900

OTHER PUBLICATIONS

Advanced Micro Devices, Inc. *Am 95C85 (CADM) Content Addressable Data Manager Technical Manual* (1986).

Advanced Micro Devices, Inc., *Am 95C85 Content Addressable Data Manager Advance Information* (Sep. 1985).

*Primary Examiner*—Archie E. Williams, Jr.
*Assistant Examiner*—Robert B. Harrell
*Attorney, Agent, or Firm*—Fish & Richardson

[57] ABSTRACT

A hard-wired circuit for sorting data including an input for receiving a new multibit word of a series of multibit words to be sorted, a plurality of comparators and respective storage devices, each comparator being connected to receive a sorted multibit word stored in its associated storage device and the new multibit word from the input and to compare the multibit words simultaneously with comparisons of other comparators and to provide a comparison output, and a controller responsive to the comparison outputs to store the new multibit word at a storage device such that it is in proper position with respect to sorted multibit words stored in other storage devices.

9 Claims, 2 Drawing Sheets

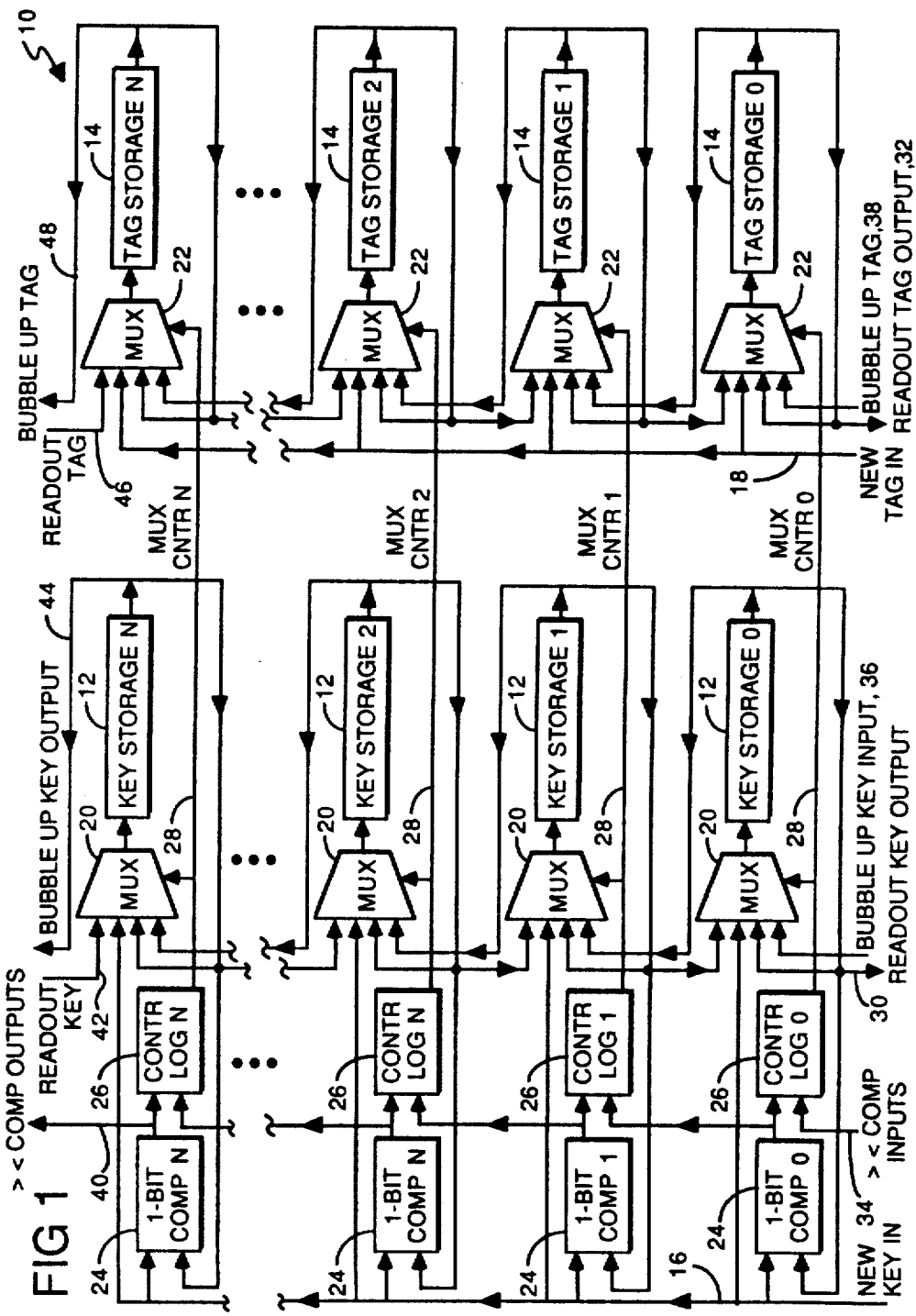

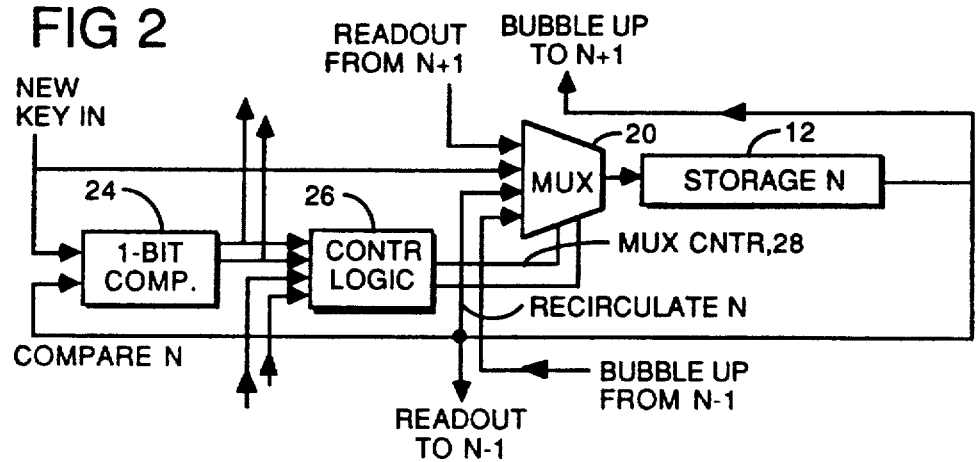
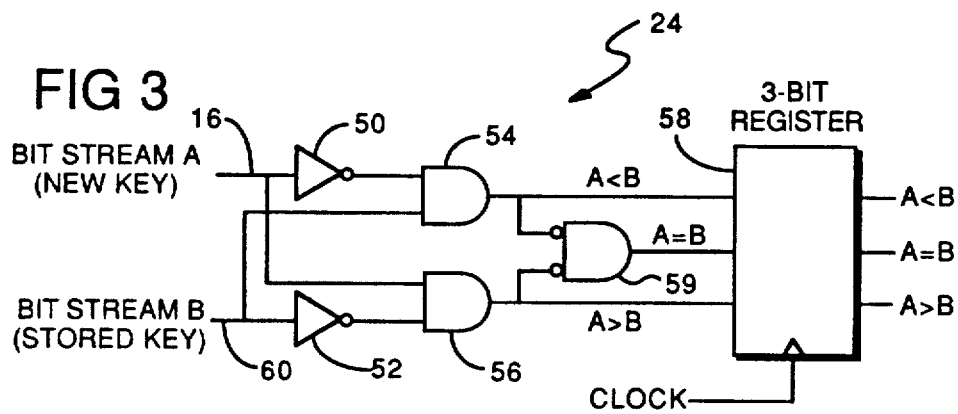
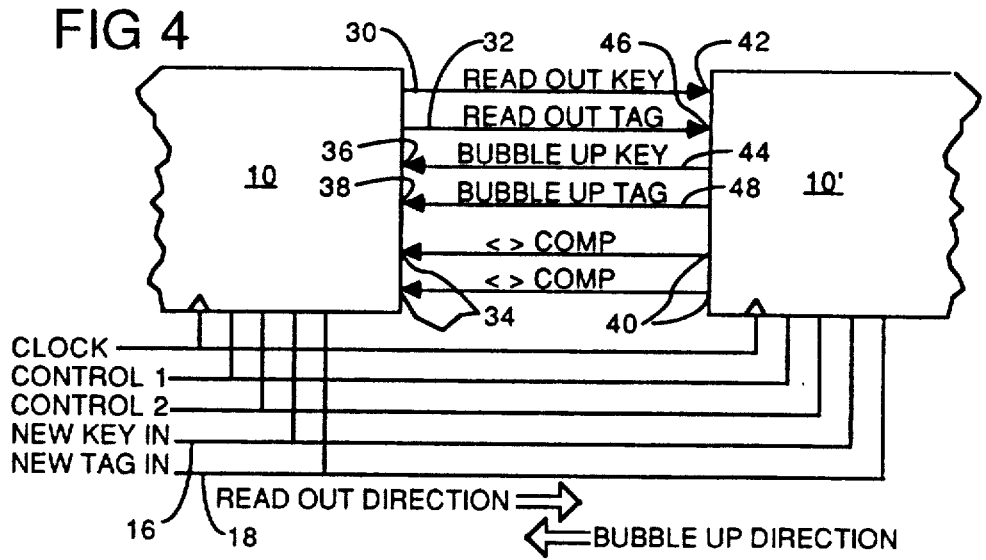

SINGLE-STAGE EXTENSIBLE SORTER FOR SORTING DATA AND EFFICIENTLY READING OUT SORTED DATA, INCORPORATING SINGLE-BIT DEVICES

BACKGROUND OF THE INVENTION

The invention relates to a hard-wired circuit for sorting data.

Large groups of numbers need to be sorted into numerical order in computer graphics and applications employing relational data bases. Sorting is typically accomplished using a general purpose processor and software commands to sort unsorted data stored in a memory. Two common methods are the bubble sort method and the bucket sort method.

The bubble sort method utilizes a compare circuit to find the largest value of the first two memory locations. If the largest value is in the lower memory location, the values are swapped, and the value now in the second location is compared with the one above it, and so on, until the largest value in the memory has been "bubbled up" to the top of the memory array. The procedure is repeated, bringing the second largest value up to the second location, etc. Sorting N items involves $N^2/2$ passes through the compare loop. As the number of items to be sorted increases, the number of passes gets so large that it seriously impedes performance.

The bucket sort method uses the actual value of the number to be sorted as its memory address. An advantage to this method is that it is quick. A drawback is the amount of memory required, as there must be as many memory locations (buckets) as possible values, regardless of the number of numbers to be sorted. E.g., sorting a series of 32-bit numbers requires that over four-billion memory locations be made available, even if there are only 100 numbers to sort. Other disadvantages are that pointers are required for duplicate values, and accessing the sorted data is slow, because each memory location must be examined for data.

A high performance integrated circuit for sorting numbers is the Advanced Micro Devices Content Addressable Data Manager, AM95C85. As its name suggests, the memory can be addressed by the values of the numbers stored in memory. Its speed of performance is a function of how well the input data are sorted.

SUMMARY OF THE INVENTION

In general the invention features a hard-wired circuit for sorting data including a plurality of storage devices and respective comparators. Each storage device (e.g., a register) is used to store one multibit word of a group of multibit words being sorted. Each new multibit word to be added to those already sorted and stored in order in the storage devices is broadcast to all comparators and simultaneously compared with stored multibit words. The comparison outputs of the comparators are used to identify the storage device in which the new multibit word is then stored so that it is in proper position with respect to stored multibit words. New multibit words are thus inserted immediately into the correct position, and sorted multibit words can be read out at any time. The time it takes the circuit to sort a list of N multibit words only grows linearly with N, and the amount of storage needed is based upon the number of multibit words being sorted.

In preferred embodiments sorted multibit words can be shifted to adjacent storage devices simultaneously with inserting a new multibit word to make room for the new word; each storage device and comparator have an associated multiplexer connected to selectively input the new multibit word, one of the multibit words stored in adjacent storage devices, or the multibit word presently stored in the associated storage device; the storage devices are shift registers; the multiplexers are single-bit multiplexers; the comparators are single-bit comparators connected to serially receive and compare the bits of the stored multibit words and the new multibit words; the single-bit comparators receive most significant bits first and freeze the comparison output the first time that compared bits are not equal; and there are two sets of storage devices and multiplexers, one used for keys (these are the numbers that are compared at the comparator in order to determine the insertion position) and one used for tags (i.e., pointers to addresses at which related data are stored). The use of single-bit comparators and multiplexers results in saving space on an integrated circuit. The circuit could be speeded up, at the cost of corresponding increased chip space, by using two- (or four-) bit comparators and multiplexers.

Other features and advantages of the invention will be apparent from the following description of a preferred embodiment thereof and from the claims.

BRIEF DESCRIPTION OF THE DRAWINGS

FIG. 1 is a block diagram of a hard-wired circuit for sorting data according to the invention.

FIG. 2 is a block diagram of components associated with a single storage device of the FIG. 1 circuit.

FIG. 3 is a schematic of a one bit comparator of the FIG. 1 circuit.

FIG. 4 is a block diagram showing connections between a plurality of the FIG. 1 circuits.

DESCRIPTION OF THE PREFERRED EMBODIMENTS

Referring to FIG. 1, there is shown sorting engine module 10, a hard-wired circuit for sorting multibit words provided in the format of 32-bit keys and associated 32-bit tags. Keys are the portions of multibit words that represent the numerical values being compared to place the multibit words in order. The tags are used to point to addresses at which related data are stored. (E.g., a tag might point to a whole block of data such as that related to a polygon in computer graphics.) Sorting engine 10 includes a plurality of key storage devices 12 and associated tag storage devices 14 for respectively storing new keys serially inputted at input 16 and associated tags serially inputted at input 18. Storage devices 12, 14 are 32-bit shift registers connected to receive an input from the associated four-to-one key multiplexer 20 or four-to-one tag multiplexer 22. Also associated with each key storage device 12 are serial one bit comparator 24 and control logic circuit 26. Each comparator 24 receives as inputs the key currently stored in associated storage device 12 and the new key inputted at input 16. Each comparator 24 provides an output (indicating whether the new key or currently stored key is greater) to its associated control logic circuit 26 and to the control logic circuit 26 associated with the storage device 12 for storing the next largest key. Each control logic circuit 26 receives as inputs the output of its associated comparator 24 and the output from the comparator associated with the key storage device 12 storing the next smallest key. The output of each control logic circuit 26 is provided as a control input to key multiplexer 20 and tag multiplexer 22.

Referring to both FIGS. 1 and 2, each key multiplexer 20 receives as inputs: the output of the storage device 12 for the next smallest key, referred to as "bubble-up" data path; a recirculate input from the output of the associated storage device 12; the new key from input 16,; and the output from the storage device 12 for the next largest key, referred to as "readout" data path. Tag multiplexer 22 includes the same four inputs for the associated tag storage devices 14. As seen in FIG. 2, two lines 28 provide the multiplexer control signal, MUX CNTR, from control logic circuit 26 to multiplexers 20, 22.

Each sorting engine module 10 also includes a readout key output 30 and readout tag output 32 for reading out sorted numbers. Each sorting engine module 10 additionally includes further inputs and outputs for connection to additional sorting engine modules 10 in a modular fashion to increase the capacity, as shown in FIG. 4. These include: greater-than/less-than comparison ( > < COMP.) inputs 34; bubble-up key input 36; bubble-up tag input 38; greater-than/less-than comparator ( > < COMP.) outputs 40; readout key input 42; bubble-up key output 44; readout tag input 46; and bubble-up tag output 48.

Referring to FIG. 3, one-bit serial comparator 24 includes two inverters 50, 52, two AND gates 54, 56, three-bit register 58, and NOR gate 59. AND gate 54 receives as inputs the output of inverter 50 and stored key input 60. AND gate 56 receives as inputs the output of inverter 52 and the new key input 16. The output of AND gate 54, when high, indicates that the new key bit is less than the stored key bit. The output of AND gate 56, when high, indicates that the new key bit is greater than the stored key bit. The outputs of AND gates 54, 56 are directly provided to three-bit register 58. The outputs of AND gates 54, 56 are also provided as inputs to AND gate 59. The output of gate 59 is also provided to register 58 and is high when both inputs are low, indicating that the new key bit and stored key bit are equal.

Sorting engine module 10 is an integrated circuit, and storage devices 12, 14 are preferably made using dynamic random access memory technology but can additionally be implemented by charge couple device (CCD) technology. The gates are CMOS or NMOS type. In FIG. 4, sorting engine module 10 is shown connected to an identical sorting engine module 10' to provide a combined sorting engine having increased capacity. Sorting engine 10' is used to store the smaller keys and associated tags and to provide the over-all readout for the combined sorting engine by its readout key output 30 and readout tag output 32 (not shown on FIG. 4). Each sorting engine module 10, 10' includes a clock input, and two control inputs, CONTROL 1, CONTROL 2, used to place sorting engines 10, 10' in one of four states: initialization; serial compare; insert/shift; and readout.

OPERATION

In operation, a sorting engine made up of one or more sorting engine modules 10, 10' is used to sort paired keys and tags and store them in numerical order according to the values of the keys. In the initialization mode, all storage devices 12 are initialized by placing ones into all locations so that new keys will have a lower value and be stored at the bottom. The new key-tag pairs are then sequentially placed in proper order in storage devices 12, 14 by cycling through the serial compare mode (to compare the new key with all stored keys) and insert/shift mode (to insert the new key and tag at the proper locations and shift stored keys and tags as necessary) for each new key tag pair.

In the serial compare mode, the 32-bit key is read in serially over input 16 and broadcasted to all one bit comparators 24. At each comparator 24 the bits of the new key are compared with the bits of the key stored in the associated storage device 12. The most significant bits are compared first, and the comparator output is frozen as soon as one of the bits is greater than the other. It thus takes 32 clock periods to compare the new key with all of the previously sorted and stored keys. The stored keys are also recirculated into the respective storage device 12 through the second input to multiplexer 20 from the bottom during the comparison. Referring to FIG. 3, in single-bit comparator 24, if the new key bit at input 16 is greater than the stored key bit at input 60, the output of AND gate 56 goes high, and the output of AND gate 54 goes low. If the stored key bit at input 60 is greater than the new key bit at input 16, the output of AND gate 54 goes high, and the output of AND gate 56 goes low If the new key bit and stored key bit are the same, the outputs of AND gates 54, 56 are low, and the output of NOR gate 59 is high (indicating that the new key bit and stored key bit are equal). As soon as the output of NOR gate 59 goes low, the clock to shift register 58 is disabled via logic components (not shown on FIG. 3) to freeze the states of shift register 58.

In the insert/shift mode, the new-key-is-less-than-old-key and new-key-is-greater-than-old-key outputs of comparators 24 are provided to logic circuits 26 to control key and tag multiplexers 20, 22. Because keys already stored in storage devices 12 are in order, all comparator 24 outputs at and above a particular storage device 12 will indicate that the new key is less than the stored key (unless the new key is the largest one of the group), and all comparator outputs below that storage device will indicate that the new key is greater than the stored key. The new key is inserted at the first storage device 12 at which the associated comparator 24 output indicates that the new key is less than the stored key. The stored key at this storage device 12 and at all higher storage devices 12 must then be shifted up one storage device. Control logic circuit 26 controls multiplexers 20 to provide the recirculate input (second from bottom) when its associated comparator 24 indicates that the new key is greater than stored key, so that storage devices 12 below the place of insertion retain their stored keys. Control logic 26 controls multiplexers 20 to provide the insert-key input (third from bottom) when the comparator output for the storage device below it indicates that the new key is greater than the stored key and its associated comparator indicates that the new key is less than the stored key. Control logic circuit 26 controls multiplexers 20 to provide the bubble-up input (the bottom input) when both the output of its comparator and the output of the comparator below it indicate that the new key is less than both stored keys. In this manner, the new value (read in from input 16) is inserted in the proper location, and all values at that location and higher are moved up one storage device, all in 32 clock periods. The same control signals are provided to tag multiplexers 22 to provide the same insertion and shifting for the associated tags.

After a new key and tag have thus been inserted, the clock to three bit register 58 is unfrozen, and the next key-tag pair is compared and inserted, and so on. To read out the stored keys and tags, multiplexers 20, 22 are controlled to connect the readout inputs (top inputs), and the multibit words are clocked through key and tag storage devices 12, 14 and are read out serially at readout key output 30 and readout tag output 32.

The sorting engine thus accepts new key/tag pairs up to its maximum capacity and instantly inserts the new pair in the correct sorted location. Sorted data can be read out at any time and will be correctly ordered. The time it takes the sorting engine to sort a list of N items grows only linearly with N. To provide additional capacity, additional sorting engine modules 10 are simply added.

OTHER EMBODIMENTS

Other embodiments of the invention are within the scope of the following claims. E.g., the storage devices could be implemented employing CCD technology to increase density. Also, to increase the speed of operation, at the cost of corresponding chip space, two-(or four-) bit comparing and multiplexing can be used.

Also, the sorting order can be controlled by an additional control line that causes the data going in and out to either be complemented or not complemented.

What is claimed is:

1. A hard-wired circuit for sorting data comprising
   input means to input a new multibit word of a series of multibit words to be sorted,
   a plurality of storage devices, each of said plurality of storage devices comprising means for storing a multibit word of said series of multibit words to be sorted,
   a plurality of comparators, each one of said plurality of comparators being connected to receive a multibit word stored in one of said plurality of storage devices and said new multibit word from said input means and to compare said multibit word stored in said one of said plurality of storage devices and said new multibit word simultaneously with comparisons of other ones of said plurality of comparators and provide a comparison output, wherein each one of said plurality of comparators is a single-bit comparator connected to serially receive and compare bits of said new multibit word and said multibit word stored in said one of said plurality of storage devices, and
   control means for identifying, based on information contained in said comparison output of each of said plurality of comparators, an identified one of said plurality of storage devices into which said new multibit word is to be stored in proper position with respect to sorted multibit words stored in other storage devices, and for storing said new multibit word in said identified one of said plurality of storage devices,
   wherein said control means includes means for simultaneously shifting sorted multibit words stored in said plurality of storage devices to adjacent storage devices to make room for said new multibit word,
   wherein said control means comprises a plurality of multiplexers, each one of said plurality of multiplexers being connected to selectively cause to be stored in a first of said plurality of storage devices either said new multibit word from said input means or a sorted multibit word stored at a second of said plurality of storage devices adjacent to said first of said plurality of storage devices, depending upon a comparison output of one of said plurality of comparators.

2. A hard-wired circuit for sorting data comprising
   input means to input a new multibit word of a series of multibit words to be sorted,
   a plurality of storage devices, each of said plurality of storage devices comprising means for storing a multibit word of said series of multibit words to be sorted,
   a plurality of comparators, each one of said plurality of comparators being connected to receive a multibit word stored in one of said plurality of storage devices and said new multibit word from said input means and to compare said multibit word stored in said one of said plurality of storage devices and said new multibit word simultaneously with comparisons of other ones of said plurality of comparators and provide a comparison output, wherein each one of said plurality of comparators is a single-bit comparator connected to serially receive and compare bits of said new multibit word and said multibit word stored in said one of said plurality of storage devices, and
   control means for identifying, based on information contained in said comparison output of each of said plurality of comparators, an identified one of said plurality of storage devices into which said new multibit word is to be stored in proper position with respect to sorted multibit words stored in other storage devices, and for storing said new multibit word in said identified one of said plurality of storage devices,
   wherein said plurality of multibit words are keys, and said input means inputs a new multibit tag of a series of tags simultaneously with said new multibit word, and further comprising a plurality of tag storage devices in which sorted multibit tags are stored, each of which tag storage device comprises means for storing a multibit tag of said series of tags, and wherein said control means comprises means for identifying, based on information contained in said comparison output of each of said plurality of comparators, an identified one of said plurality of tag storage devices into which said new multibit tag is to be stored in proper position with respect to sorted multibit tags stored in other tag storage devices, and for storing said new multibit tag in said identified one of said plurality of tag storage devices.

3. A hard-wired circuit for sorting data comprising
   input means to input a new multibit word of a series of multibit words to be sorted,
   a plurality of storage devices, each of said plurality of storage devices comprising means for storing a multibit word of said series of multibit words to be sorted,
   a plurality of comparators, each one of said plurality of comparators being connected to receive a multibit word stored in one of said plurality of storage devices and said new multibit word from said input means and to compare said multibit word stored in said one of said plurality of storage devices and said new multibit word simultaneously with comparisons of other ones of said plurality of comparators and provide a comparison output, wherein each one of said plurality of comparators is a single-bit comparator connected to serially receive and compare bits of said new multibit word and said multibit word stored in said one of said plurality of storage devices, and control means for identifying, based on information contained in said comparison output of each of said plurality of comparators, an identified one of said plurality of storage devices into which said new multibit word is to be stored in proper position with respect to sorted multibit words stored in other storage devices, and for storing said new multibit word in said identified one of said plurality of storage devices, wherein said control means comprises a plurality of multiplexers, each one of said plurality of multiplexers being connected to selectively cause to be stored in a first of said plurality of storage devices either said new multibit word from said input means, said multibit word stored in said first of said plurality of storage devices, or a sorted multibit word stored at a second of said plurality of storage devices adjacent to said first of said plurality of storage devices, depending upon a comparison output of one of said plurality of comparators, and each of said plurality of multiplexers is a single-bit multiplexer, and each one of said plurality of storage devices is a shift register connected to receive a serial input from a first one of said plurality of multiplexers, to provide a serial output to one of said plurality of comparators, and to provide said serial output to said first one of said plurality of multiplexers and to a second one of said plurality of multiplexers adjacent to said first one of said plurality of multiplexers.

4. A hard-wired circuit for sorting data comprising
input means to input a new multibit word of a series of multibit words to be sorted,
a plurality of storage devices, each of said plurality of storage devices comprising means for storing a multibit word of said series of multibit words to be sorted,
a plurality of comparators, each one of said plurality of comparators being connected to receive a multibit word stored in one of said plurality of storage devices and said new multibit word from said input means and to compare said multibit word stored in said one of said plurality of storage devices and said new multibit word simultaneously with comparisons of other ones of said plurality of comparators and to provide a comparison output, and
control means for identifying, based on information contained in said comparison output of each of said plurality of comparators, an identified one of said plurality of storage devices into which said new multibit word is to be stored in proper position with respect to sorted multibit words stored in other storage devices, and for storing said new multibit word in said identified one of said plurality of storage devices, said control means including means for simultaneously shifting sorted multibit words stored in said plurality of storage devices to adjacent storage devices to make room for said new multibit word,
said control means comprising a plurality of multiplexers, each one of said plurality of multiplexers being connected to receive said new multibit word from said input means, a multibit word stored in a first of said plurality of storage devices, and a sorted multibit word stored at a second of said plurality of storage devices adjacent to said first of said plurality of storage devices, and to selectively output either said new multibit word, said multibit word stored in said first of said plurality of storage devices, or said sorted multibit word stored at said second of said plurality of storage devices, to said first of said plurality of storage devices, depending upon a comparison output of one of said plurality of comparators, wherein each of said plurality of comparators is a single-bit comparator connected to serially receive and compare bits of said new multibit word and said multibit word stored in said one of said plurality of storage devices, each of said plurality of multiplexers is a single-bit multiplexer, and each one of said plurality of storage devices is a shift register connected to receive a serial input from a first one of said plurality of multiplexers, to provide a serial output to one of said plurality of comparators, and to provide said serial output to said first one of said plurality of multiplexers and to a second one of said plurality of multiplexers adjacent to said first one of said plurality of multiplexers.

5. The circuit of claim 4 wherein said serial output of each of said plurality of storage devices is also connected as a further input to a third one of said plurality of multiplexers adjacent to said first one of said plurality of multiplexers.

6. A hard-wired circuit for sorting data comprising
input means to input a new multibit word of a series of multibit words to be sorted,
a plurality of storage devices, each of said plurality of storage devices comprising means for storing a multibit word of said series of multibit words to be sorted,
a plurality of comparators, each one of said plurality of comparators being connected to receive a multibit word stored in one of said plurality of storage devices and said new multibit word from said input means and to compare said multibit word stored in said one of said plurality of storage devices and said new multibit word simultaneously with comparisons of other ones of said plurality of comparators and to provide a comparison output,
control means for identifying, based on information contained in said comparison output of each of said plurality of comparators, an identified one of said plurality of storage devices into which said new multibit word is to be stored in proper position with respect to sorted multibit words stored in other storage devices, and for storing said new multibit word in said identified one of said plurality of storage devices, said control means comprising a plurality of multiplexers, each one of said plurality of multiplexers being connected to selectively cause to be stored in a first of said plurality of storage devices either said new multibit word from said input means, said multibit word stored in said first of said plurality of storage devices, or a sorted multibit word stored at a second of said plurality of storage devices adjacent to said first of said plurality of storage devices, depending upon a comparison output of one of said plurality of comparators, and each of said multiplexers being connected to cause to be read into said first of said plurality of storage devices, during a readout mode of operation of said circuit for sorting data, a sorted multibit word stored at a third of said plurality of storage devices adjacent to said first of said plurality of storage devices but located in a direction from said first of said plurality of storage devices that is opposite to a direction of said second of said plurality of storage devices from said first of said plurality of storage devices.

7. An integrated circuit chip for sorting data comprising input means to input a new multibit word of a series of multibit words to be sorted, a plurality of storage devices, each of said plurality of storage devices comprising means for storing a multibit word of said series of multibit words to be sorted, a plurality of comparators, each one of said plurality of comparators being connected to receive a multibit word stored in one of said plurality of storage devices and said new multibit word from said input means and to compare said multibit word stored in said one of said plurality of storage devices and said new multibit word simultaneously with comparisons of other ones of said plurality of comparators and provide a comparison output, control means for identifying, based on information contained in said comparison output of each of said plurality of comparators, an identified one of said plurality of storage devices into which said new multibit word is to be stored in proper position with respect to stored multibit words stored in other storage devices, and for storing said new multibit word in said identified one of said plurality of storage devices, and an input port and an output port for extensibly connecting said integrated circuit chip to at least one identical chip in modular fashion to form a circuit having a storage capacity that is greater than a storage capacity of a single said integrated circuit chip, wherein said control means comprising a plurality of multiplexers, each one of said plurality of multiplexers being connected to selectively cause to be stored in a first of said plurality of storage devices either said new multibit word from said input means, said multibit word stored in said first of said plurality of storage devices, or a sorted multibit word stored at a second of said plurality of storage devices adjacent to said first of said plurality of storage devices, depending upon a comparison output of one of said plurality of comparators, and said input port comprises a bubble-up input terminal for a multibit word input to one of said plurality of multiplexers, and said output port comprises a bubble-up output terminal for a multibit word output to one of a plurality of multiplexers of said at least one identical chip.

8. The circuit of claim 7 wherein each of said plurality of multiplexers is connected to receive said new multibit word from said input means, said multibit word stored in said first of said plurality of storage devices, and said sorted multibit word stored at said second of said plurality of storage devices, and one of said plurality of multiplexers receives, instead of a sorted multibit word stored at a second of said plurality of storage devices, a sorted multibit word stored at one of a plurality of storage devices of said at least one identical chip, and said multibit word input on said bubble-up input terminal comprises said sorted multibit word stored at said one of said plurality of storage devices of said at least one identical chip.

9. The circuit of claim 7 wherein each of said multiplexers is connected to cause to be stored in said first of said plurality of storage devices, during a readout mode of operation of said integrated circuit chip, a sorted multibit word stored at a third of said plurality of storage devices adjacent to said first of said plurality of storage devices but located in a direction from said first of said plurality of storage devices that is opposite to a direction of said second of said plurality of storage devices from said first of said plurality of storage devices, said input port comprises a readout input terminal for a multibit word input to a storage device, and said output port comprises a readout output terminal for a multibit word output to a storage device of said at least one identical chip.

* * * * *